United States Patent
Koegel et al.

(10) Patent No.: US 7,922,987 B2
(45) Date of Patent: Apr. 12, 2011

(54) CATALYTICALLY COATED DIESEL PARTICLE FILTER, PROCESS FOR PRODUCING IT AND ITS USE

(75) Inventors: Markus Koegel, Roemerberg (DE); Marcus Pfeifer, Solingen (DE); Gerald Jeske, Neuberg (DE); Frank Walter Schuetze, Aschaffenburg (DE); Stéphanie Frantz, Hanau (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 12/377,753

(22) PCT Filed: Aug. 17, 2007

(86) PCT No.: PCT/EP2007/058550
§ 371 (c)(1),
(2), (4) Date: Dec. 29, 2009

(87) PCT Pub. No.: WO2008/022967
PCT Pub. Date: Feb. 28, 2008

(65) Prior Publication Data
US 2010/0092358 A1    Apr. 15, 2010

(30) Foreign Application Priority Data
Aug. 19, 2006   (DE) .................. 10 2006 039 028

(51) Int. Cl.
*B01D 46/00* (2006.01)
*B01D 53/94* (2006.01)
*B01J 23/38* (2006.01)
*F01N 3/24* (2006.01)

(52) U.S. Cl. .................. 423/213.2; 423/213.5; 423/247; 423/245.3; 423/215.5; 60/299; 502/325; 502/439; 502/514; 502/527.12; 95/285

(58) Field of Classification Search ............... 423/213.2, 423/213.5, 247, 245.3, 215.5; 60/299; 502/325, 502/439, 514, 527.12; 95/285
See application file for complete search history.

(56) References Cited

U.S. PATENT DOCUMENTS 7,576,031 B2 *   8/2009   Beutel et al. .................. 502/339
2007/0025901 A1 *   2/2007   Nakatsuji et al. .......... 423/239.2

FOREIGN PATENT DOCUMENTS

| | | |
|---|---|---|
| DE | 102004020259 A1 | 11/2005 |
| DE | 102004048247 A1 | 4/2006 |
| EP | 1721665 A1 | 11/2006 |
| WO | 2006021336 A1 | 3/2006 |
| WO | 2006021338 A1 | 3/2006 |
| WO | 2006031600 A1 | 3/2006 |
| WO | 2007058867 A1 | 5/2007 |
| WO | 102005062317 A1 | 7/2007 |
| WO | 2007093325 A1 | 8/2007 |

OTHER PUBLICATIONS

Written Opinion (PCT/EP2007/058550), dated Nov. 30, 2007.
International Search Report (PCT/EP2007/058550) dated Nov. 30, 2007.
Notification of Transmittal of Translation of the International Preliminary Report on Patentability and Written Opinion PCT/EP2007/058550) dated Mar. 17, 2009.

* cited by examiner

*Primary Examiner* — Timothy C Vanoy
(74) *Attorney, Agent, or Firm* — Kalow & Springut LLP; William D. Schmidt

(57) ABSTRACT

A diesel particulate filter with an oxidation catalyst comprising platinum and palladium deposited thereon is described. Addition of HC storage components to the oxidation catalyst allows the conversion of hydrocarbons and carbon monoxide to be improved significantly.

12 Claims, No Drawings

CATALYTICALLY COATED DIESEL PARTICLE FILTER, PROCESS FOR PRODUCING IT AND ITS USE

FIELD OF THE INVENTION

The invention relates to a catalytically coated diesel particulate filter for cleaning the exhaust gases of diesel engines, to a process for coating the filter and to the use thereof.

BACKGROUND OF THE INVENTION

Particulate filters are capable of filtering particulate exhaust gas constituents, particularly soot particles, out of the exhaust gas of internal combustion engines, thus preventing their emission into the atmosphere. In principle, it is possible for this purpose to use either surface filters or depth filters. Surface filters consist typically of ceramic materials, for example silicon carbide, cordierite, aluminum titanate or mullite. These filters achieve filtration levels of more than 95%. Alternatively to the surface filters, it is also possible to use open structures for deposition of soot particles. These open structures are primarily ceramic foams or filters composed of metallic wire braids. The filtration efficiency of these open filter systems is much lower than that of typical surface filters (<70%).

The actual challenge in the operation of a particulate filter in the exhaust gas of an internal combustion engine is, however, not the filtration of the soot particles but the periodic regeneration of the filters used. Since the temperatures of more than 550° C. required to ignite and combust the soot with oxygen in modern passenger vehicle diesel engines can typically only be achieved in full-load operation, additional measures are absolutely necessary for oxidation of the filtered soot particles, in order to prevent blockage of the filter. In general, a distinction is drawn here between passive and active heating measures. In the case of active measures, the temperature of the particulate filter is raised, for example, by using an electrical heater (for example glow plugs or else microwave heaters) or a burner operated with fuel. Such active measures are always associated with an increased fuel demand. For this reason, in many systems available on the market, the use of passive measures is preferred. In the case of passive systems, the use of catalysts lowers the ignition temperature required to combust the soot particles. This can be achieved through two different concepts. One concept is the use of organometallic fuel additives, for example cerium compounds and iron compounds, which are combusted with the fuel and become intercalated in the soot layer, finely distributed in the form of metal clusters, as a homogeneous catalyst. One alternative to the additive-based systems is the coating of the particulate filters with a catalytically active material.

Since the lowering of the soot ignition temperature by catalytic measures is generally insufficient to ensure full regeneration of the filter in all states of operation of the engine, the current practice is typically to employ a combination of passive and active measures. The combination of the particulate filter with an oxidation catalyst arranged upstream has been found to be particularly useful. As a result of injection of additional fuel in combination with other engine-related measures (for example partial throttling), unburnt fuel and carbon monoxide reach the diesel oxidation catalyst and are converted there catalytically to carbon dioxide and water. The heat of reaction released heats up the exhaust gas and hence also the downstream particulate filter. In combination with a lowering of the soot ignition temperature by means of a catalytic coating of the filter or else through the use of fuel additives, the injection required can be reduced and the filter can be regenerated virtually at any operating point within the characteristic map of the engine.

In the first generation of exhaust gas aftertreatment systems comprising catalytically coated particulate filters, the filters were usually arranged after one or two upstream oxidation catalysts in the underbody of the motor vehicle. In new exhaust gas aftertreatment systems, the filters, in contrast, are installed as close as possible downstream of the engine. Owing to the restricted construction space and to reduce costs, the oxidation catalyst in these cases is applied partially or completely to the filter. Such a filter arranged close to the engine must, to comply with the legal limits for carbon monoxide (CO) and hydrocarbons (HC) over the required distance traveled, possess a correspondingly high oxidation potential. In addition, it must also be capable over the entire run time of converting the hydrocarbons injected during an active filter regeneration, in order thus to generate the exothermicity required to achieve the soot ignition temperature. Furthermore, the catalytically active coating for use of such a filter close to the engine must have a high thermal stability.

To date, virtually exclusively filter coatings comprising platinum have been used for diesel passenger vehicles. Coatings comprising platinum and palladium have likewise become known (DE 102004040549 A1). Coatings comprising platinum and palladium are notable for a very good thermal stability, but possess a lower fresh activity than catalytic coatings comprising platinum alone. The principle of platinum- and palladium-containing coatings was first described some time ago. Owing to the significantly lower tolerance of Pt/Pd coatings toward poisoning by sulfur and the associated decrease in the catalytic activity, the use of palladium in exhaust gas catalytic converters for diesel passenger vehicles was prevented for a long time. Since, however, sulfurization is a poisoning which is reversible at high temperatures, the noble metal sites of the catalytic coating are simultaneously desulfated during the regenerations in the case of periodically actively regenerating systems, for example in the case of diesel particulate filters. This re-establishes the original oxidation activity.

WO 02/26379 A1 describes, among other things, a soot filter which comprises two catalyst layers one on top of another. The first layer is present on the inlet channels of the filter and comprises components for oxidizing carbon monoxide and hydrocarbons. These components consist of support materials with platinum group metals deposited thereon, the support materials being selected from the group consisting of aluminum oxide, silicon oxide, titanium oxide, zirconium oxide and zeolite, and the platinum group metals being selected from platinum, palladium and rhodium. The second layer is applied to the first layer and comprises components for lowering the ignition temperature of soot, more particularly at least one oxygen-storing compound and at least one platinum group metal.

SUMMARY OF THE INVENTION

It is an object of the invention to provide a catalytically coated diesel particulate filter with an improved conversion for carbon monoxide and hydrocarbons, which additionally has a high aging stability even in the case of frequently repeated regenerations of the filter.

This object is achieved by a catalytically coated particulate filter according to the main claim. Preferred embodiments of the filter and a process for coating the filter and the use thereof are specified in the subclaims.

The particulate filter has an entry side and an exit side for the exhaust gases and an axial length. The filter is coated over its entire length with a first catalyst which comprises platinum group metals as catalytically active components on support materials. The filter is characterized in that the support materials for the platinum group metals are selected from the group consisting of aluminum oxide, silicon dioxide, titanium dioxide, zirconium oxide, cerium oxide and mixtures or mixed oxides thereof, and in that the first catalyst additionally comprises at least one zeolite for storage of hydrocarbons. In addition, the particulate filter is coated with a second catalyst which does not comprise a zeolite over a fraction of the length proceeding from the entry side.

The zeolites used for the first catalyst preferably have a modulus (molar $SiO_2$ to $Al_2O_3$ ratio) of more than 10 in order to be sufficiently stable toward the acidic components of the exhaust gas and the maximum exhaust gas temperatures. Suitable zeolites are, for example, mordenite, silicalite, Y zeolite, ZSM-5 zeolite and beta zeolite or mixtures thereof, said zeolites having a molar ratio of silicon dioxide to aluminum oxide between 10 and 400. In addition to the zeolites, it is also possible to use other materials, for example activated carbon.

DETAILED DESCRIPTION OF THE PREFERRED EMBODIMENTS

During operating phases of the engine with low exhaust gas temperature below approx. 200° C., the zeolites store the hydrocarbons present in the exhaust gas. This is important since oxidation of the hydrocarbons at the active noble metal sites of the catalyst is impossible at these low exhaust gas temperatures. In modern passenger vehicle diesel engines, such operating phases occur both during a cold start and during idling phases, and also in urban traffic. At temperatures above about 200° C., in contrast, the desorption of the hydrocarbons predominates. At these higher catalyst temperatures, however, the hydrocarbons released from the storage components can be converted over the active sites of the catalyst to carbon dioxide and water.

To increase the catalytic activity, the zeolites may additionally be catalytically activated with platinum group metals (platinum, palladium, rhodium, iridium) or with transition metals (for example, iron, copper, cerium). For activation with platinum group metals, the zeolites can be impregnated, for example, with aqueous solutions of soluble precursor compounds. After the impregnation, the zeolites are dried, calcined and optionally reduced. The noble metal loading on the zeolite is preferably between 0.1 and 10% by weight, based on the total weight of zeolites and platinum group metals.

In the case of use of zeolites exchanged with transition metals (iron, copper and cerium), the zeolites in the ammonium or sodium form are doped by ion exchange with the transition metals. The ion exchange can be carried out either in solution or as a so-called solid state ion exchange. The loading with transition metals is preferably approx. 1 to 15% by weight based on the total weight.

The first catalyst comprises at least one platinum group metal or a plurality thereof, preferably a combination of platinum and palladium with a weight ratio of platinum to palladium of 1:10 to 20:1, preferably of 1:1 to 10:1, especially 2:1. Suitable support materials for the platinum group metals are aluminum oxide, silicon dioxide, titanium dioxide, zirconium dioxide, cerium oxide and mixtures or mixed oxides thereof. The support materials can be thermally stabilized by doping with rare earth oxides, alkaline earth metal oxides or silicon dioxide. For example, in the case of aluminum oxide, doping with barium oxide, lanthanum oxide or silicon dioxide can increase the conversion temperature of γ- to α-aluminum oxide from approx. 950 up to 1100° C. The concentration of the doping elements, calculated as the oxide and based on the total weight of the stabilized aluminum oxide, is typically 1 to 40% by weight. In the case of use of cerium oxide as the support material, it is advantageous to use cerium/zirconium mixed oxides, since these generally possess a higher thermal stability than the pure cerium oxide. The stability of the cerium/zirconium mixed oxides can be improved further by doping with praseodymium oxide or neodymium oxide. In addition, cerium/zirconium mixed oxides also possess advantageous oxygen storage properties, with regard both to the maximum oxygen storage capacity and to the kinetics of oxygen storage and release.

The particulate filter is coated with the second catalyst over a fraction of its length proceeding from the entry side. This second catalyst may be identical to or else different from the first catalyst, both with regard to the catalytically active noble metals and with regard to the support materials used. Preference is given to using, for the additional coating, a catalyst with the same composition as the first catalyst. However, the second catalyst does not comprise any zeolites. The length of the second catalyst may be 5 to 80% of the total length of the filter substrate, preferably 10 to 50%.

The application of the second catalyst from the entry side of the filter leads to a graduated concentration of the catalytically active components. More catalytically active components are present in the front part of the filter. This is particularly advantageous in the case of diesel particulate filters with integrated oxidation catalyst arranged close to the engine. This is because the frequently used silicon carbide filter substrates possess a large thermal mass and have a strong axial temperature gradient in the test cycles prescribed for certification, for example the NEDC (=New European Driving Cycle). For instance, especially in the case of use of relatively long diesel particulate filters (>150 mm), the temperatures required for the conversion of carbon monoxide and hydrocarbons are generally not attained over the entire test cycle in the back part of the filter arranged downstream. Accordingly, in the case of a homogeneously coated filter, a portion of the noble metal would contribute only to a small degree or even not at all to the conversion of carbon monoxide and hydrocarbons. For this reason, it is advantageous, particularly in the case of filters arranged close to the engine, to distribute the noble metals graduated over the length of the particulate filter, such that a zone with relatively high noble metal loading is present on the inflow side and a region with relatively low noble metal loading on the outflow side. However, the noble metal concentration should not be below a minimum of approx. 0.1 g/l on the filter outlet side, since there is otherwise the risk of so-called secondary emissions, i.e. breakthroughs of carbon monoxide and hydrocarbons, in the case of active filter regenerations.

In the coating of diesel particulate filters, particular attention has to be paid to a minimum increase in the backpressure through the coating. It has been found that the increase in the backpressure through the coating can be kept low when the catalyst materials are essentially deposited within the porous walls of the filter substrate. For this purpose, various methods can be utilized:

introduction in the form of solid powder materials suspended in aqueous solution, in which case the mean particle diameter of the powder materials must be significantly smaller than the mean pore diameter of the filter substrates;

introduction in the form of sols;

introduction in the form of solutions of precursors of the later support materials, which are only converted to their final form by a final calcination.

The introduction of the catalyst materials in the form of solid powder materials leads to catalytic activities and thermal stabilities which are distinctly superior to the other two coating processes. Introduction in the form of solutions of precursors of the later support materials, in contrast, possesses distinct advantages with regard to the backpressure behavior of coated particulate filters, and is therefore a suitable coating process especially in the case of use of critical substrates (low porosity, low mean pore diameter).

In the case of use of solid powder materials, these are suspended, for example, in water and ground for the purpose of homogenization and establishment of a defined particle size distribution. The grinding is performed such that the maximum particle size in the suspension is less than 10 μm. This is generally the case when the $d_{50}$ diameter is less than 2 μm. Only this small particle size allows the catalyst to be deposited virtually exclusively in the pores of the substrate. The support materials used in the suspension are typically already activated with platinum group elements before they are introduced into the suspension. However, it is also possible only to add dissolved precursor compounds of the catalytically active platinum group metals to the suspension of the support materials. In addition, it is also possible, after application of the support materials to the filter substrate, to subsequently impregnate the filter with soluble precursors of the platinum group metals.

It has been found that the particle diameters should preferably be established separately by grinding for catalyst materials and zeolites. Catalyst materials and zeolites have different hardnesses. Only by separate grinding for both materials can a comparable particle size distribution be guaranteed. Therefore, for the coating of the filter, two separate suspensions are first made up. The first suspension comprises the support materials which are activated with noble metals (for example platinum, palladium). The second suspension comprises the zeolites. The zeolites are preferably doped in a preceding process step by impregnation or ion exchange with noble metal. However, it is also possible to add noble metal to the zeolite suspension with the aid of suitable precursor compounds. In the case of both suspensions, a mean particle diameter $d_{50}$ less than 2 μm is then established separately by grinding; the $d_{90}$ value should be not more than 5-6 μm. Directly before the actual coating process, the two suspensions are mixed and homogenized.

Both the first and the second catalyst may comprise zeolites. However, it has been found to be advantageous for diesel particulate filters arranged close to the engine when the zeolites are distributed homogeneously over the entire length of the filter. In this case, only the first catalyst comprises zeolites. The second catalyst then serves only to increase the concentration of the catalytically active noble metals in the front part of the particulate filter. In the case of such an arrangement, especially under transient conditions, as, for example, in the NEDC, the axial temperature profile in the filter, which is highly pronounced in the case of filter substrates composed of silicon carbide, can be exploited optimally.

The distribution of the zeolites between the first and second catalysts influences the development of the exhaust gas backpressure of the coated filters. When the zeolites are introduced only into the second catalyst, the backpressure is significantly higher than when the zeolites are coated homogeneously with the first catalyst over the entire length of the filter. The use of zeolites in the first and second catalysts, in contrast, showed no significant difference in backpressure behavior with equal overall loading of zeolites compared to the exclusive arrangement of the zeolites in the first catalyst.

In principle, the storage capacity for hydrocarbons increases with rising amount of zeolites. However, the maximum usable amount of zeolites depends significantly on the porosity and the mean pore diameter of the filter substrate used. Typical zeolite loadings range from 5 g/l (filter volume) in the case of low-porosity substrates (<50%) to approx. 50 g/l in the case of substrates with relatively high porosity (>50%). The ratio of zeolites to the support materials doped with noble metal in the inventive particulate filters is preferably 0.1 to 10.

The known filter substrates are suitable for the diesel particulate filters. Preference is given to using so-called wall flow filters composed of silicon carbide, cordierite, aluminum titanate or mullite. In order to enable optimal intercalation of the catalyst materials and of the zeolites into the pores of the filter substrates, the material of the filters should possess an open-pore structure with a porosity between 40 and 80% and a mean pore diameter between 9 and 30 μm.

The invention is now illustrated with reference to the examples and figures which follow. Several diesel particulate filters with different coatings were produced and tested for their cleaning performance on an engine test bench and in a test vehicle in the NEDC European test cycle. The filters were analyzed in the fresh state and after hydrothermal aging (atmosphere composed of 10% $H_2O$, 10% $O_2$, remainder $N_2$; 16 h at 750° C. in a chamber furnace).

The substrates used were in each case a filter composed of silicon carbide with a cell density of 46.5 $cm^{-1}$ (300 cpsi) and a thickness of the channel walls of 0.3 mm (12 mil). The porosity of the filter material used was 60%; the mean pore diameter was 20 μm. The filter bodies had a length of 152.4 mm.

Backpressure Measurements

To assess the influence of the loading of particulate filters with zeolites, the backpressure of three particulate filters laden differently with support oxides and zeolites was measured in a backpressure apparatus at flow rates between 150 and 300 $m^3/h$.

Filter 1 was unladen. Filter 2 received a coating with an aluminum oxide suspension which, after drying and calcination, had a loading concentration of about 30 g/l. Filter 3 was coated with aluminum oxide and with a zeolite mixture of a Y zeolite and a beta zeolite (mixing ratio 1:1). Aluminum oxide and zeolites were, in accordance with the invention, ground separately until the mean particle size of aluminum oxide and of the zeolites was less than 2 μm. The loading of filter 3 was 30 g/l of aluminum oxide and 10 g/l of the zeolite mixture.

The measurements on the backpressure apparatus showed that the coating of filter 2 with a pure aluminum oxide suspension increased the backpressure by from approx. 15 to 20% compared to the uncoated filter 1. The addition of only 10 g/l of zeolite led, in contrast, in the case of filter 3, to a backpressure increased by approx. 50% compared to the uncoated substrate.

Comparative Example

Filter C

A filter substrate was first coated homogeneously over the entire filter length with a Pt/Pd catalyst supported on a stabilized γ-aluminum oxide. The coating suspension was ground until a mean particle diameter of less than 2 μm had been attained. As a result, the coating step deposited the catalyst material almost completely into the pores of the filter substrate. The Pt/Pd ratio of this first catalyst layer was 2:1 and the noble metal loading was 2.12 g/l (60 g/ft$^3$). In a second coating step, a second catalyst layer with a noble metal content of likewise 2.12 g/l (60 g/ft$^3$) and identical Pt/Pd ratio was applied over half of the filter length. The resulting total noble metal loading of the comparative filter C was thus approx. 90 g/ft$^3$, or 3.18 g/l. The second catalyst layer was also intercalated predominantly into the pores of the filter substrate.

Example 1

Filter F1

A second filter substrate was coated with the inventive catalyst. The filter was first coated homogeneously over the entire filter length with a noble metal loading of 60 g/ft$^3$. In contrast to the comparative example, the inventive coating, however, contained, in addition to the γ-aluminum oxide stabilized with Pt/Pd in a ratio of 2:1, also a zeolite mixture composed of a Y zeolite and a beta zeolite (mixing ratio 1:1). Before being added to the coating suspension, both zeolites were doped with small amounts of Pt (0.5% by weight) by means of impregnation. The ratio of γ-aluminum oxide to zeolite mixture was approx. 1:1. Thereafter, in a further coating step, the entry side of the filter, over a length of 76.2 mm, was coated with an additional 2.12 g/l of noble metal using the identical coating suspension. The total concentration of the noble metals Pt and Pd on the filter F1 was thus 3.18 g/l (90 g/ft$^3$) at a Pt/Pd ratio of 2:1.

The testing of the catalytic activity of the two filters was carried out in the fresh state and after a hydrothermal furnace aging on a EURO IV certified passenger vehicle with a 103 kW 2.0 l diesel engine with pump-nozzle injection system. The filters were arranged close to the engine and were analyzed without an upstream diesel oxidation catalyst in the NEDC (New European Driving Cycle) test cycle. The results including the untreated emissions of the vehicle are compiled in table 1.

The emissions in the NEDC show clearly that the use of the zeolites as an HC storage component in filters F1 significantly reduced HC emission both in the fresh state and after hard thermal aging (16 hours, 790° C.). What is remarkable is that the same is also true for CO emissions. After aging, a reduction in CO emissions by more than 30% is observed.

Example 2

Filter F2 and F3

Analogously to example 1 (filter F1), two further filter substrates were coated with a noble metal loading of 3.18 g/l. In the filter F2, in contrast to the filter F1, the amount of zeolite of 20 g/l was applied over the entire filter length exclusively in the first catalyst layer. In filter F3, the zeolites were applied exclusively with the second catalyst layer. The zeolites used were, as in example 1, a mixture of a Y zeolite and a beta zeolite (mixing ratio 1:1). The two zeolites used had each been doped with 0.5% by weight of Pt.

The catalytic activity of the filters F2 and F3 was likewise carried out both fresh and after hydrothermal oven aging on a EURO IV certified passenger vehicle with a 103 kW 2.0 l diesel engine with pump-nozzle injection system. The results are likewise reproduced in table 1.

Especially after hydrothermal aging at 790° C., an improved emission performance both in relation to the hydrocarbons emitted in the NEDC and to the CO emissions was also found for filters F2 and F3. It is found to be advantageous to use the HC storage components over the entire filter length. A division of the amount of zeolite between the first and second catalyst shows no advantage compared to the exclusive use of the zeolites in the first catalyst. The exclusive use of the zeolites in the second catalyst is less favorable with regard to the emissions of hydrocarbons and carbon monoxide in the NEDC. Compared to F1, HC emission increases by approx. 60%; CO emissions rise by approx. 18%. In spite of this, the use of the zeolites in the "high-loading" zone at the filter inlet also brings about a significant reduction in pollutant emissions in the NEDC compared to the filter V of the comparative example.

TABLE 1

Untreated emissions and bag emissions of CO and HC in the NEDC (diesel passenger vehicle 103 kW, 2.0 l Euro IV certified).

| Filter | State | CO emission [g/km] | HC emission [g/km] |
|---|---|---|---|
| Untreated emission | — | 0.96 | 0.23 |
| V | fresh | 0.033 | 0.039 |
| V | aged | 0.230 | 0.056 |
| F1 | fresh | 0.027 | 0.012 |
| F1 | aged | 0.157 | 0.029 |
| F2 | fresh | 0.044 | 0.013 |
| F3 | fresh | 0.048 | 0.021 |
| F2 | aged | 0.143 | 0.028 |
| F3 | aged | 0.185 | 0.047 |

Example 3

Filter F4, F5, F6, F7

In a further test program, four catalytically coated particulate filters were coated with different amounts of zeolites. The four filters F4 to F7 were produced analogously to filter F1. The filters were first coated homogeneously over the entire filter length with a noble metal loading of 2.12 g/l (corresponds to 60 g/ft$^3$). In a second coating step, the filters were coated with a zone over a length of 76.2 mm with an additional 2.12 g/l of noble metal, so as to give rise to a total noble metal loading of 90 g/ft$^3$ (Pt/Pd=2:1). While the amount of support oxides (stabilized γ-aluminum oxide) was kept constant, the four filters were coated with different amounts of zeolite (from 10 to 40 g/l), the same zeolite mixture composed of 50% Y zeolite and 50% beta zeolite as for filter F1 having been used both for the first and for the second catalyst. The Pt concentration on the zeolites was 0.5% by weight. Table 2 shows the compositions of the four inventive filters F4-F7.

To test the HC storage capacity of the inventive filters as a function of the zeolite content, storage tests were carried out on a 4 cylinder diesel engine with a common rail injection system (2.2 l, 100 kW). The storage tests were carried out at a constant engine operating point with a filter inlet temperature of approx. 110° C. The HC emissions upstream and downstream of the catalyst were recorded with the aid of an FID analyzer (AMA 2000, Pierburg). The storage tests were each conducted until the HC concentration downstream of the catalyst had reached a steady-state value for the duration of approx. 10 minutes. The amount of HC stored was determined from the HC concentrations upstream and downstream of the catalyst:

The results shown in table 2 show clearly that the amount of HC stored increases sharply as a result of the use of zeolites.

Even the use of 10 g/l of zeolite leads to a 2.5-fold increase in the amount of hydrocarbons stored in the storage test. With a further increase in zeolite content in the individual catalyst, the HC storage capacity increases continuously. Only at zeolite contents above 25 g/l does a kind of saturation behavior appear to occur.

TABLE 2

Noble metal content and zeolite loading for the filters F4 to F7 and the amount of HC stored during the HC storage test on the engine test bench

| Filter | NM content [g/l] | Zeolite loading [g/l] | Mass of HC stored [g] |
|---|---|---|---|
| V | 90 | none | 1.29 |
| F4 | 90 | 10 | 2.49 |
| F5 | 90 | 17 | 3.62 |
| F6 | 90 | 23 | 4.77 |
| F7 | 90 | 40 | 5.74 |

The storage of hydrocarbons by the HC storage components reduces the adsorption of hydrocarbon species at the active oxidation sites of the catalyst. This also positively influences the conversion of carbon monoxide.

The intercalation of the zeolites into the pores of the filter substrate substantially suppresses their adverse effect on the backpressure of the filter.

What is claimed is:

1. A particulate filter for treating the exhaust gases of diesel engines comprising an entry side and an exit side for the exhaust gases and an axial length, said particulate filter being coated with a first catalyst which comprises platinum group metals as catalytically active components on support materials, characterized in that the support materials for the platinum group metals are selected from the group consisting of aluminum oxide, silicon dioxide, titanium dioxide, zirconium oxide, cerium oxide and mixtures or mixed oxides thereof, and in that the first catalyst additionally comprises at least one zeolite for storage of hydrocarbons, and in that the particulate filter is coated with a second catalyst which does not comprise a zeolite over a fraction of the length proceeding from the entry side.

2. The particulate filter as claimed in claim 1, characterized in that the zeolites are selected from the group consisting of mordenite, silicalite, Y zeolite, ZSM-5 zeolite and beta zeolite or mixtures thereof, said zeolites having a molar ratio of silicon dioxide to aluminum oxide between 10 and 400.

3. The particulate filter as claimed in claim 2, characterized in that the zeolites have been exchanged with transition metal ions.

4. The particulate filter as claimed in claim 3, characterized in that the transition metals present are iron, copper or cerium or mixtures thereof.

5. The particulate filter as claimed in claim 2, characterized in that the zeolites are present in the H or Na form and have likewise been catalytically activated with at least one platinum group metal, the concentration of the platinum group metals being between 0.1 and 10% by weight, based on the total weight of the zeolites.

6. The particulate filter as claimed in claim 1, characterized in that both catalysts comprise, as platinum group metals, platinum and palladium in a weight ratio between 1:10 and 20:1.

7. The particulate filter as claimed in claim 1, characterized in that the weight ratio of support oxides including the platinum group elements to the doped zeolites in the first catalyst is from 0.1 to 10.

8. The particulate filter as claimed in claim 1, characterized in that the catalysts are essentially intercalated in the pores of the particulate filter.

9. The particulate filter as claimed in claim 1, characterized in that the particulate filter comprises a wall flow filter which is composed of ceramic material and whose walls have an open-pore structure with a porosity between 40 and 80% and a mean pore diameter between 9 and 30 mm.

10. A process for producing a particulate filter of claim 1, by applying two catalysts in the form of suspension coatings to the particulate filter.

11. The process as claimed in claim 10, characterized in that in each case two suspensions are first prepared for the coating of each and every individual catalyst, one suspension comprising the support materials activated with the platinum group metals and the second suspension comprising the zeolites, and both suspensions being ground to a mean particle diameter of less than 2 mm and being mixed and homogenized with one another shortly before the coating of the filter.

12. A method of using the particulate filter according to claim 1, the method comprising passing exhaust gas from a diesel engine through the particulate filter to reduce carbon monoxide, hydrocarbon and soot particle levels in the exhaust gas of the diesel engine.

* * * * *